(12) United States Patent
Ramstrom

(10) Patent No.: US 8,516,107 B2
(45) Date of Patent: Aug. 20, 2013

(54) PRIVILEGED ACTIVITY MONITORING THROUGH PRIVILEGED USER PASSWORD MANAGEMENT AND LOG MANAGEMENT SYSTEMS

(75) Inventor: Christopher J. Ramstrom, Nottingham, NH (US)

(73) Assignee: Computer Associates Think, Inc., Islandia, NY (US)

( * ) Notice: Subject to any disclaimer, the term of this patent is extended or adjusted under 35 U.S.C. 154(b) by 621 days.

(21) Appl. No.: 12/790,434

(22) Filed: May 28, 2010

(65) Prior Publication Data

US 2011/0296001 A1    Dec. 1, 2011

(51) Int. Cl.
*G06F 15/16* (2006.01)
*G06F 12/00* (2006.01)

(52) U.S. Cl.
USPC ........................................... 709/224; 709/250

(58) Field of Classification Search
USPC ........................ 709/217–218, 250
See application file for complete search history.

(56) References Cited

U.S. PATENT DOCUMENTS

| | | | |
|---|---|---|---|
| 2003/0233544 A1* | 12/2003 | Erlingsson | 713/167 |
| 2005/0267847 A1* | 12/2005 | Blechman | 705/75 |
| 2006/0136964 A1* | 6/2006 | Diez et al. | 725/37 |
| 2009/0150418 A1* | 6/2009 | Shuster | 707/100 |
| 2010/0241972 A1* | 9/2010 | Spataro et al. | 715/753 |
| 2011/0202969 A1* | 8/2011 | Warn et al. | 726/1 |

OTHER PUBLICATIONS

Laurie, Ben, "Nigori: Storing Secrets in the Cloud," May 23, 2010.

* cited by examiner

*Primary Examiner* — Zarni Maung
(74) *Attorney, Agent, or Firm* — Womble Carlyle Sandridge & Rice, LLP

(57) ABSTRACT

A system and method is provided for allowing seamless auditing compliance and investigations of privileged account access and activities. Account access information and privileged activity information may be stored in a central data repository. The central data repository may be queried to determine who was granted access to a privileged account, the timeframe that the access was granted, and/or what actions were performed by the user who was granted access.

15 Claims, 2 Drawing Sheets

PRIVILEGED ACTIVITY MONITORING THROUGH PRIVILEGED USER PASSWORD MANAGEMENT AND LOG MANAGEMENT SYSTEMS

TECHNICAL FIELD

The invention relates to the field of regulatory and/or corporate policy compliance monitoring/management systems and products.

BACKGROUND

Organizations face increased pressure of maintaining regulatory and/or corporate policy compliance. Many policies (for example, SOX, PCI, GLBA, etc.) require strict management of privileged (typically administrative) accounts. This management includes who has access to these accounts, the purpose for which these accounts are being used and the auditing of the administrative activities while the account was being used. Compliance auditors will ask for proof that these activities are being retained for a certain period of time, actively monitored and acted upon if out of compliance. Thus, an organization may be required to keep track of who is accessing certain system resources and what activities they are performing. However, access to sensitive activities such as modifying configuration files at a system resource is oftentimes restricted to a particular group of physical users such as IT administrators having root access. Typically, such users may login as a privileged user such as the root user using a password dedicated to the root user account. Because more than one physical user may login as the privileged user, it may be difficult to identify the physical user who performed particular activities while logged in as the privileged user. When faced with many hundreds or thousands of servers and millions of administrative/privileged transactions per day this becomes a daunting task for any organization.

SUMMARY

In some implementations, the invention relates to a system and method for monitoring privileged account access and activities. An access control management sub-system may track the identity of a physical user who was granted privileged access to an enterprise resource (i.e., the user who used the privileged account associated with the enterprise resource) and the timeframe for which the user was granted access. A log management sub-system may track the privileged/administrative activities performed on or associated with the enterprise resource. Uniting these two pieces of data allows the enterprise to associate the physical user with the privileged activity as well as perform automated processes, such as, revoking account privileges.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
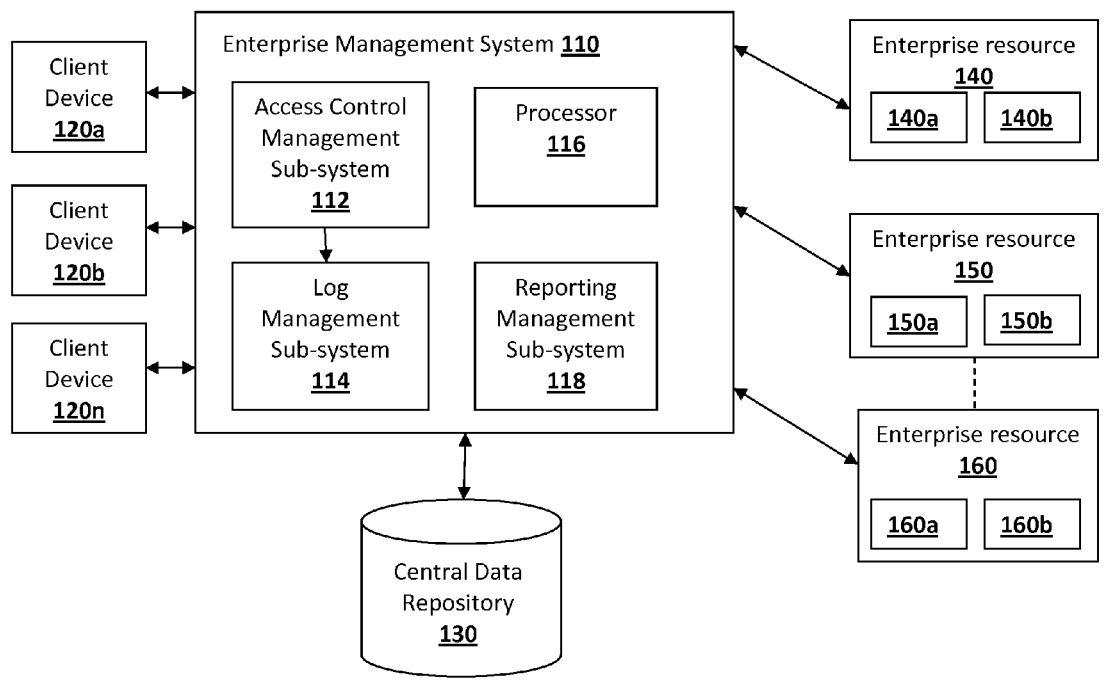
FIG. 1 illustrates an exemplary system 100, according to various aspects of the invention.

FIG. 1 is an exemplary illustration of a system 100, according to an aspect of the invention. System 100 may include, among other things, at least an enterprise management system 110 that is configured to monitor and/or record privileged account access and activities associated with one or more enterprise resources 140, 150, 160. Enterprise resources 140, 150, 160 may comprise one or more enterprise devices and/or applications, for example, servers, computers, security devices (e.g., IDS scanners, vulnerability scanners, etc.), firewalls, routers, operating systems, databases, web applications, virtual machines, hypervisors (i.e., virtual machine monitors), and/or other devices/applications. Enterprise resources 140, 150, 160 may include resources across disparate operating systems and platforms. A privileged account may refer to an administrative account associated with an enterprise resource and a privileged user may be defined as a user who has or has been granted administrative/privileged access (for example, sa or root account access) to one or more enterprise resources 140, 150, 160.

Enterprise management system 110 may include, among other components, an access control management sub-system 112, a log management sub-system 114, a reporting management sub-system 118, and/or a processor 116. In some implementations, although illustrated in FIG. 1 as being separate, any of these components may be combined or included in one another (for example, reporting management sub-system 118 may be included in or be part of the log management sub-system 114, etc.)

Enterprise management system 110 may include a processor 116, circuitry and/or other hardware operable to execute computer-readable instructions. According to one aspect of the invention, system 100 may include one or more tangible computer-readable storage media configured to store one or more software modules, wherein the software modules include computer-readable instructions that when executed by the processor cause the processor to perform the functions described herein. According to one implementation, enterprise management system 110 may comprise computer hardware programmed with at least one computer application having one or more software modules that enable the various features and functions of the invention. Non-limiting examples of the software modules in the application may include one or more of an access control management sub-system 112, a log management sub-system 114, a reporting management sub-system 118, and/or other modules for performing the features and functions described herein.

In some implementations, while FIG. 1 depicts one processor 116 associated with enterprise management system 110, it will be understood that each of the sub-systems 112, 114, 118 may have their own processors 116 without departing from the scope of the invention. Each of the sub-systems 112, 114, 118 may be separate systems/devices that are configured to perform the various functions described below.

In some implementations, each sub-system may include one or more tangible computer-readable storage media configured to store one or more software modules, wherein the software modules include computer-readable instructions that when executed by the processor cause the processor to perform the functions described herein. In some implementations, the sub-systems 112, 114, 118 may be communicatively coupled to one another.

Enterprise resources 140, 150, 160 may include one or more tangible computer-readable storage media configured to store one or more agents 140a/b, 150a/b, 160a/b, wherein the agents include computer-readable instructions that when executed by the corresponding processors (not shown) associated with enterprise resources 140, 150, 160 may cause the processors to perform the functions described herein. In some implementations, agents 140a/b, 150a/b, 160a/b may comprise any software agents, hardware agents, operating system level agents, and/or other components that can perform the functions described herein with respect to agents 140a/b, 150a/b, and/or 160a/b.

According to one implementation, access control management sub-system 112 may provide privileged user password management (PUPM) for protecting enterprise resources 140, 150, 160 across platforms and operating systems against illicit, malicious, and non-compliant access. Access control management sub-system 112 may by communicate with one or more agents 140a, 150a, 160a running on respective enterprise resources 140, 150, 160 to ensure secure access to privileged accounts.

In one implementation, a user may request to gain privileged access to enterprise resource 140 (i.e., gain access to a privileged account associated with enterprise resource 140 or otherwise login as the privileged user), for example. Enterprise resource 140 may comprise an agent 140a that requests and accepts the user's identity information (for example, a user id, user name and/or other information) from the user and provides this identity information to access control management sub-system 112. Access control management sub-system 112 may determine whether the user is a privileged user and/or whether he/she has permission to access the privileged account associated with enterprise resource 140 and/or services/applications running on enterprise resource 140. In response to a determination that the user is a privileged user and/or has permission to access the privileged account, access control management sub-system 112 may grant the user privileged access to enterprise resource 140, which may be referred to as a check-out event. Check-out event may include the 'checking-out' of a privileged account password (i.e., allocation of the privileged account password) that may be used by the user to gain privileged access to enterprise resource 140. The check-out event may indicate the start of an administrative session and may be tracked by agent 140a. In response to a determination that the user is not a privileged user and/or does not have permission to access the privileged account, access control management sub-system 112 may deny privileged access to enterprise resource 140.

Once the user has privileged access to enterprise resource 140, the user may perform one or more administrative/privileged activities (e.g., administrative maintenance of hardware, software, and information, backup operations, managing user access, and/or other activities) on or associated with the enterprise resource 140. These administrative/privileged activities may be separately monitored and/or logged by agent 140b, and collected by log management sub-system 114, as described in detail below. When the user has completed the administrative activities, the user may end the session, which may be referred to as a check-in event. Check-in event may include the checking-in of the privileged account password (i.e., de-allocation of the privileged account password) so that the password can be re-assigned to the same or other users during subsequent user requests to gain privileged access to the same or other enterprise resources. The check-in event may indicate the end of the administrative session and may be tracked by agent 140a. In one implementation, the check-in event may be performed manually by the user. In one implementation, the check-in event may be performed automatically by access control management sub-system 112 after a specific time period.

In one implementation, agent 140a may monitor and/or track privileged account access information associated with enterprise resource 140. Agent 140a may monitor the privileged account access information for one or more administrative sessions associated with enterprise resource 140. Privileged account access information may include, among other things, the privileged user's identity information identifying the physical user who is granted privileged access, time of check-out and check-in events (i.e. timeframe of an administrative session or timeframe for which the physical user was granted privileged access), the enterprise resource identifying information (for example, machine id, IP address, etc.) identifying the resource for which privileged access is granted, a session identifier, and/or privileged account identifier indicating, for example, root or sa account for which privileged access is granted. The check-out event time may indicate a time when the physical user was granted privileged access. The check-in event time may indicate the time when the physical user ended the privileged access. It will be understood that any form of information identifying the privileged user and enterprise resource may be utilized without departing from the scope of the invention.

In one implementation, agent 140a may provide the privileged account access information to access control management sub-system 112. Based on this information, access control management sub-system 112 may determine, for example, the timeframe that the privileged physical user had access to the privileged account associated with a particular enterprise resource 140. Access control management sub-system 112 may, however, not know what the user did with the account.

According to an aspect of the invention, agents 150a and 160a may perform functions that are similar to the functions performed by agent 140a as described above, albeit for managing privileged access to corresponding enterprise resources 150 and 160. As such, access control management sub-system 112 may manage, monitor, and/or track privileged access to one or more enterprise resources 140, 150, 160 via one or more respective agents 140a, 150a, 160b.

In one implementation, log management sub-system 114 may communicate with one or more agents 140b, 150b, 160b running on respective enterprise resources 140, 150, 160 to collect log data from the enterprise resources 140, 150, 160, normalize the log data into a common schema and report across the enterprise. For example, for a firewall device, log data may include connection accepts, connection denies, configuration changes to firewall policy, etc. For an operating system, log data may include local event logs, security application logs, login events, logout events, operating system updates, etc. For security devices such as vulnerability scanners, log data may include what devices were scanned by the scanner, a report of each scanned device, etc.

In one implementation, agent 140b, for example, may monitor, track and/or log one or more privileged/administrative activities performed at enterprise resource 140. Agent 140b may log privileged activity information associated with enterprise resource 140, which may include but not be limited to, one or more privileged activities that are performed (privileged activity identifiers identifying privileged activities), the time/timeframe indicating when the privileged activities were performed, the privileged account identifier and/or password being used to perform the privileged activities, etc. Agent 140*b* may provide the privileged activity information to log management sub-system 114.

According to an aspect of the invention, agents 150*b* and 160*b* may perform functions that are similar to the functions performed by agent 140*b* as described above, albeit for tracking and logging privileged activity information associated with corresponding enterprise resources 150 and 160.

In one implementation, log management sub-system 114 may collect privileged activity information from each enterprise resource 140, 150, 160 via agents 140*b*, 150*b*, and 160*b*, respectively. Based on the privileged activity information, log management sub-system 114 may determine, for example, the privileged activities that were performed using a privileged account. Log management sub-system 114 may, however, not know which particular user performed the activities. For example, an enterprise may have five administrators who can use a root account/password to perform root activities on or associated with an enterprise resource. In this case, log management sub-system 114 may know that privileged activities were performed on a particular resource, but may not know the identity of the administrator who performed the privileged activities (i.e., which of the five administrators performed a particular privileged activity).

According to an aspect of the invention, access control management sub-system 112 and log management sub-system 114 may communicate to provide tighter access control and monitoring of privileged (administrative) activities, and the capability of tracing these activities to a physical user. In one implementation, access control management sub-system 112 may communicate the privileged account access information associated with each enterprise resource 140, 150, 160 to log management sub-system 114. Log management sub-system 114 may store the privileged account access information and the collected privileged activity information from each enterprise resource 140, 150, 160 in central data repository 130. While central data repository 130 in FIG. 1 is illustrated as being separate from and communicatively coupled to enterprise management system 110, it will be understood that central data repository 130 may be included in enterprise management system 110, or may be communicatively coupled to and/or included in any of the sub-systems 112, 114, or 118, without departing from the scope of the invention.

In one implementation, a physical user may be granted privileged access to enterprise resource 140 by access control management sub-system 112 indicating a check-out event. The privileged user may perform administrative activities on or associated with the enterprise resource 140. Agent 140*b* may monitor and/or log the administrative activities, time/timeframe indicating when the administrative activities were performed (i.e., privileged activity information) and may provide the privileged activity information to log management sub-system 114. Once the privileged user has completed the administrative activities, the administrative session may end indicating a check-in event. Agent 140*a* may track privileged account access information (e.g., check-out/check-in event times, user identity information, etc.) associated with the session/resource and may provide the information to access control management sub-system 112. Access control management sub-system 112 may communicate the privileged account access information to log management sub-system 114. Log management sub-system 114 may store the privileged account access information and the privileged activity information (associated with the session) in the central data repository 130. In some implementations, the privileged account access information and the privileged activity information may be stored in separate records in central data repository 130. In some implementations, central data repository 130 may, for a particular administrative session, store at least two records including one or more portions of privileged account access information and at least one record including privileged activity information. For example, a first record may include time of check-out event, privileged user's identity information at time of check-out, enterprise resource identifier at time of check-out, and/or privileged account identifier at time of check-out.

In some implementations, a second record may, in addition to all the information in the first record, include time of check-in event, privileged user's identity information at time of check-in, enterprise resource identifier at time of check-in, and/or privileged account identifier at time of check-in. A third record may store the privileged activity information. It will be understood that the privileged account access information and privileged activity information may be stored in any other format as long as queries may be run against this information stored in the central data repository, without departing from the scope of the invention.

In one implementation, access control management sub-system 112 may track check-out/check-in event times, physical user identity, etc., and log management sub-system 114 may track the privileged activities, etc. Combining (i.e., storing together) these two pieces of information allows for association of a physical user with the privileged activity and also allows for implementation of runtime monitoring features such as revoking root privileges if certain activities are performed.

It should be understood that while access control management sub-system 112 and log management sub-system 114 are depicted as being implemented on a single system, they can be implemented on separate systems as long as they can communicate with one another to transfer privileged account access information.

In one implementation, queries may be run against central data repository 130 to determine the physical user who was granted access to a privileged account, the timeframe that the physical user was granted access to the privileged account, what privileged activities were performed by the physical user during access to the privileged account, etc. In one implementation, operators (or other users) may interact with the enterprise management system 110 via one or more client devices 120*a*, . . . , 120*n*. Client devices 120*a*, . . . , 120*n* may each comprise a user interface (not shown) that may enable users to perform various operations that may facilitate interaction with enterprise management system 110 including, for example, providing requests to retrieve information from central data depository 130, discovering and maintaining list of privileged accounts in the enterprise, configuring policies for access control (i.e. privileged access), logging of privileged activities, normalizing of log data, and/or performing other operations. Client devices 120*a*, . . . , 120*n* may include a processor (not shown), circuitry, and/or other hardware operable to execute computer-readable instructions.

In one implementation, at least one of client devices 120*a*, . . . , 120*n* may include a web user interface (i.e., PUPM console) that allows operators to manage access control and provide privileged user management across physical and virtual systems, devices and applications. In one implementation, at least one of the client devices 120*a*, . . . , 120*n* may include a web user interface (i.e. Log management console) that allows operators to manage the collection of log data from enterprise resources, normalizing of the log data and reporting across the enterprise.

In one implementation, operators may utilize the PUPM console, the log management console (or other user interface associated with a client device) to provide requests for information from central data repository 130. Reporting management sub-system 118 may receive these requests for information. The requests may include queries for particular information from central data repository 130. The requests may include one or more parameters, such as, timeframes for which information is desired, enterprise resource ids of enterprise resources for which information is desired, user ids of physical users for which information is desired, privileged activity identifiers of privileged activities for which information is desired, and/or other parameters. Based on the one or more parameters, reporting management sub-system 118 may query central data repository 130 to retrieve the requested information. For example, a request may include a timeframe and a resource id. Reporting management sub-system 118 may query the central data repository based on the timeframe and resource id and may retrieve information regarding the physical users (e.g., user ids) who were granted privileged access to the resource (whose resource id is provided in the request) during the timeframe and/or what privileged activities (e.g., activity identifiers) were performed. In one implementation, a request may include a timeframe and a user id. Reporting management sub-system 118 may query the central data repository based on the timeframe and user id and may retrieve information regarding what enterprise resources (e.g., resource ids) were accessed by the physical user (whose user id is provided in the request) during the timeframe and/or what privileged activities (e.g., activity identifiers) were performed. In one implementation, a request may include a privileged activity identifier. Reporting management sub-system 118 may query the central data repository based on the privileged activity identifier and may retrieve information regarding what physical users (e.g., user ids) performed the privileged activity (whose identifier is provided in the request) and on what enterprise resources (e.g., resource ids). According to an aspect of the invention, such queries are possible because both privileged account access information (including, for example, check-out/check-in event times for privileged access or timeframe for privileged access, physical user identity of user granted privileged access, the resource identity of the resource for which privileged access is granted, etc.) and privileged activity information (including, for example, the privileged activities performed, time/timeframe indicating when the privileged activities were performed) associated with various enterprise resources are stored in central data repository 130. As such, when the central data repository is queried, the privileged account access information and the privileged activity information stored in the repository is queried based on parameters provided in the request, thereby providing for a comprehensive view of privileged account access and activities, wherein activities can be traced to a physical user.

In one implementation, based on the retrieved information, it may be determined whether any non-compliant activity has been performed by a user and/or on a particular resource. In other words, seamless auditing compliance and investigations of privileged account access and activities may be performed. In one implementation, chained queries may be performed by reporting management sub-system 118. For example, a first query may query the central data repository based on a user id (provided in a request). Based on the query, information regarding what enterprise resources were accessed by the physical user (whose user id is provided in the request) and/or what privileged activities were performed maybe retrieved. If further investigation of the activities performed the user is desired, a second request and/or query may be generated/received which may query the central data repository to retrieve any past activity performed by the user from one or more enterprise resources that were accessed by the user.

Reporting management sub-system 118 may generate reports based on the retrieved information that may be viewed by the operators via client devices 120a, . . . , 120n. It should be understood that the type of requests, queries, and reports described herein are exemplary, and other types of requests/queries including one or more parameters may be utilized to retrieve information from the central data repository.

Figure 2:
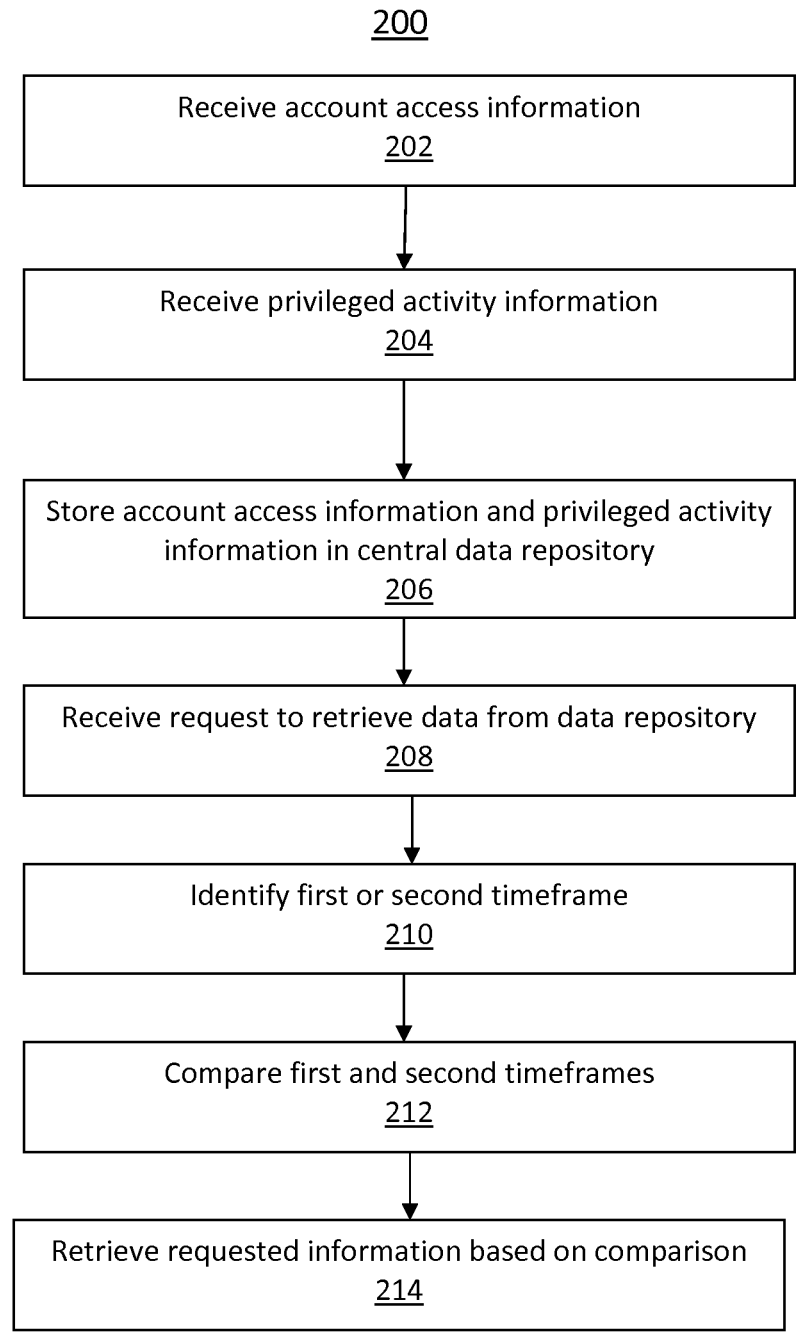
FIG. 2 is a flowchart depicting example operations performed by the enterprise management system, according to various aspects of the invention.

FIG. 2 is a flowchart 200 depicting example operations performed by enterprise management system 110 to monitor privileged account access and activities, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In operation 202, account access information may be received from agents 140a, 150a, 160a running on enterprise resources 140, 150, 160. In one implementation, account access information associated with each enterprise resource may be received by access control management sub-system 112. In operation 204, privileged activity information may be received from agents 140b, 150b, 160b running on enterprise resources 140, 150, 160. In one implementation, privileged activity information associated with each enterprise resource may be received by log management sub-system 114. In one implementation, the account access information may be communicated to log management sub-system 114 by access control management sub-system 112. Log management sub-system 114 may then store the account access information and privileged activity information in central data repository, in operation 206.

In operation 208, a request to retrieve data from the central data repository may be received. The request may be received by access control management sub-system 112, log management sub-system 114, or other component of system 110 as appropriate. In some implementations, the request includes a query or other request to obtain at least a portion of the account access information or the privileged activity information. In some implementations, the request includes one or more of the physical user identifier, a resource identifier identifying the at least one enterprise resource, and the one or more privileged activities. In other words, the request may be a query that provides one or more pieces of information such as, for example, (1) a user having privileged access to a resource, (2) a resource identifier, and/or (3) privileged activities that occurred in an enterprise in order to obtain, for example, (1) what privileged activities were performed while the user had privileged access, (2) what users had privileged access to the resource and what activities were performed during such access, and/or (3) who performed the privileged activities and from which resources. As would be appreciated, the foregoing are non-limiting examples listed for illustrated purposes only. Different combinations of information may be included and/or sought by the request.

In some implementations, the request includes a physical user identifier that identifies a physical user who was granted privileged access. In these implementations, the request may seek to obtain what activities were performed by the physical user and/or on which machines these activities were performed.

In some implementations, the request includes a resource identifier that identifies an enterprise resource. In these implementations, the request may seek to identify users who had privileged access to the particular enterprise resource and/or identify the activities those users performed during the privileged access.

In some implementations, the request includes an activity identifier that identifies privileged activities that occurred in an enterprise. In these implementations, the request may seek to identify the physical users that performed the privileged activities and/or the enterprise resources from which such activities were performed.

In operation 210, the first timeframe or the second timeframe associated with the one or more of the physical user identifier, a resource identifier identifying the at least one enterprise resource, and the one or more privileged activities included with the request may be identified, based on the information in the data repository for example. In the foregoing example where the request included or otherwise identified the particular enterprise resource, the first timeframe associated with when and/or for how long a physical user was granted privileged access to the particular enterprise resource may be identified. Likewise, the second timeframe associated with particular activities that occurred on the particular enterprise resource may be identified.

In operation 212, in response to the request, the identified first timeframe or the second timeframe may be compared with the other of the first timeframe or the second timeframe. For example, when the first timeframe is identified as described above in relation to operation 210, the first timeframe associated with users having privileged access may be compared to timeframes associated with privileged activity occurring at the particular enterprise resource in order to determine, for example, what activities occurred at the particular enterprise resource during a timeframe (e.g., the second timeframe) that coincides with the first timeframe. Likewise, when the second timeframe is identified as described above in relation to operation 210, the second timeframe associated with privileged activity that occurred may be compared to timeframes (e.g., the first timeframe) associated with physical users who had privileged access at the particular enterprise resource in order to determine, for example, who had privileged access to the resource coinciding with the second timeframe.

In operation 214, the requested information based on the comparison may be retrieved from the central data repository. Because the first timeframe may be associated with the time during which and/or timeframe for which a physical user was granted privileged access to an enterprise resource and the second timeframe may be associated with the time during which privileged activities occurred, by comparing the two timeframes, the physical user and the privileged activities may be associated with one another. In this manner, tight integration between otherwise disparate systems of access control and activity management may be achieved. As previously noted, existing systems fail to provide this capability because such information was typically managed/stored separately if at all.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for monitoring one or more privileged activities in an enterprise, the method executed by one or more processors configured to perform a plurality of operations, the operations comprising:
   receiving account access information, wherein the account access information includes at least one physical user identifier identifying a physical user who has been granted privileged access to at least one enterprise resource, and a first timeframe for which the physical user was granted privileged access;
   receiving privileged activity information, wherein the privileged activity information includes one or more privileged activities performed at the at least one enterprise resource and a second timeframe for which the one or more privileged activities were performed;
   storing the account access information and the privileged activity information in a central data repository;
   receiving a request to retrieve at least a portion of the privileged account information or at least a portion of the account access information, wherein the request includes one or more of the physical user identifier, a resource identifier identifying the at least one enterprise resource, and the one or more privileged activities;
   identifying the first timeframe or the second timeframe associated with the one or more of the physical user identifier, a resource identifier identifying the at least one enterprise resource, and the one or more privileged activities included with the request;
   in response to the request, comparing the identified first timeframe or the second timeframe with the other of the first timeframe or the second timeframe; and
   retrieving, from the central data repository, the requested information based on the comparison.

2. The computer-implemented method of claim 1, wherein the first timeframe for which the physical user was granted privileged access includes at least one check-out event time and at least one check-in event time, wherein the check-out event time indicates a time when the physical user was granted privileged access, and the check-in event time indicates the time when the physical user ended the privileged access.

3. The computer-implemented method of claim 1, wherein the request includes the resource identifier, the operations further comprising:

determining the physical user identifier that identifies the physical user who was granted privileged access to the at least one enterprise resource identified by the resource identifier; and determining the one or more privileged activities that occurred at the at least one enterprise resource identified by the resource identifier based on the comparison.

4. The computer-implemented method of claim 1, wherein the request includes the physical user identifier, the operations further comprising:

determining the at least one enterprise resource for which the physical user identified by the physical user identifier included in the request was granted privileged access; and determining the one or more privileged activities that occurred at the determined enterprise resource based on the comparison.

5. The computer-implemented method of claim 1, wherein the request includes at least one privileged activity identifier that identifies the one or more privileged activities that occurred, the operations further comprising:

determining the at least one enterprise resource where the one or more privileged activities identified by the at least one privileged activity identifier occurred; and determining the physical user identifier identifying the physical user who was granted privileged access to the determined at least one enterprise resource based on the comparison.

6. A tangible computer-readable storage medium having one or more computer-readable instructions thereon which when executed by one or more processors cause the one or more processors to:

receive account access information, wherein the account access information includes at least one physical user identifier identifying a physical user who has been granted privileged access to at least one enterprise resource, and a first timeframe for which the physical user was granted privileged access;

receive privileged activity information, wherein the privileged activity information includes one or more privileged activities performed at the at least one enterprise resource and a second timeframe for which the one or more privileged activities were performed;

store the account access information and the privileged activity information in a central data repository;

receive a request to retrieve at least a portion of the privileged account information or at least a portion of the account access information, wherein the request includes one or more of the physical user identifier, a resource identifier identifying the at least one enterprise resource, and the one or more privileged activities;

identify the first timeframe or the second timeframe associated with the one or more of the physical user identifier, a resource identifier identifying the at least one enterprise resource, and the one or more privileged activities included with the request;

in response to the request, compare the identified first timeframe or the second timeframe with the other of the first timeframe or the second timeframe; and retrieve, from the central data repository, the requested information based on the comparison.

7. The tangible computer-readable storage medium of claim 6, wherein the first timeframe for which the physical user was granted privileged access includes at least one check-out event time and at least one check-in event time, wherein the check-out event time indicates a time when the physical user was granted privileged access, and the check-in event time indicates the time when the physical user ended the privileged access.

8. The tangible computer-readable storage medium of claim 6, wherein the request includes the resource identifier, and wherein the one or more instructions further cause the one or more processors to:

determine the physical user identifier that identifies the physical user who was granted privileged access to the at least one enterprise resource identified by the resource identifier; and determine the one or more privileged activities that occurred at the at least one enterprise resource identified by the resource identifier based on the comparison.

9. The tangible computer-readable storage medium of claim 6, wherein the request includes the physical user identifier, and wherein the one or more instructions further cause the one or more processors to:

determine the at least one enterprise resource for which the physical user identified by the physical user identifier included in the request was granted privileged access; and determine the one or more privileged activities that occurred at the determined enterprise resource based on the comparison.

10. The tangible computer-readable storage medium of claim 6, wherein the request includes at least one privileged activity identifier that identifies the one or more privileged activities that occurred, and wherein the one or more instructions further cause the one or more processors to:

determine the at least one enterprise resource where the one or more privileged activities identified by the at least one privileged activity identifier occurred; and determine the physical user identifier identifying the physical user who was granted privileged access to the determined at least one enterprise resource based on the comparison.

11. A computer-implemented system for monitoring one or more privileged activities in an enterprise, the system comprising:

one or more processors configured to:

receive account access information, wherein the account access information includes at least one physical user identifier identifying a physical user who has been granted privileged access to at least one enterprise resource, and a first timeframe for which the physical user was granted privileged access;

receive privileged activity information, wherein the privileged activity information includes one or more privileged activities performed at the at least one enterprise resource and a second timeframe for which the one or more privileged activities were performed;

store the account access information and the privileged activity information in a central data repository;

receive a request to retrieve at least a portion of the privileged account information or at least a portion of the account access information, wherein the request includes one or more of the physical user identifier, a resource identifier identifying the at least one enterprise resource, and the one or more privileged activities;

identify the first timeframe or the second timeframe associated with the one or more of the physical user identifier, a resource identifier identifying the at least one enterprise resource, and the one or more privileged activities included with the request;

in response to the request, compare the identified first timeframe or the second timeframe with the other of the first timeframe or the second timeframe; and retrieve, from the central data repository, the requested information based on the comparison.

12. The computer-implemented system of claim 11, wherein the first timeframe for which the physical user was granted privileged access includes at least one check-out event time and at least one check-in event time, wherein the check-out event time indicates a time when the physical user was granted privileged access, and the check-in event time indicates the time when the physical user ended the privileged access.

13. The computer-implemented system of claim 11, wherein the request includes the resource identifier, and wherein the one or more processors are further configured to:

determine the physical user identifier that identifies the physical user who was granted privileged access to the at least one enterprise resource identified by the resource identifier; and determine the one or more privileged activities that occurred at the at least one enterprise resource identified by the resource identifier based on the comparison.

14. The computer-implemented system of claim 11, wherein the request includes the physical user identifier, and wherein the one or more processors are further configured to:

determine the at least one enterprise resource for which the physical user identified by the physical user identifier included in the request was granted privileged access; and determine the one or more privileged activities that occurred at the determined enterprise resource based on the comparison.

15. The computer-implemented system of claim 11, wherein the request includes at least one privileged activity identifier that identifies the one or more privileged activities that occurred, and wherein the one or more processors are further configured to:

determine the at least one enterprise resource where the one or more privileged activities identified by the at least one privileged activity identifier occurred; and determine the physical user identifier identifying the physical user who was granted privileged access to the determined at least one enterprise resource based on the comparison.

* * * * *